(12) United States Patent
Park et al.

(10) Patent No.: US 12,446,171 B2
(45) Date of Patent: Oct. 14, 2025

(54) DISPLAY APPARATUS

(71) Applicant: SAMSUNG ELECTRONICS CO., LTD., Suwon-si (KR)

(72) Inventors: Jaehoo Park, Suwon-si (KR); Sangkyun Im, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 220 days.

(21) Appl. No.: 18/205,816

(22) Filed: Jun. 5, 2023

(65) Prior Publication Data

US 2024/0040721 A1 Feb. 1, 2024

Related U.S. Application Data

(63) Continuation of application No. PCT/KR2023/006046, filed on May 3, 2023.

(30) Foreign Application Priority Data

Aug. 1, 2022 (KR) .................. 10-2022-0095668

(51) Int. Cl.
*H05K 5/02* (2006.01)

(52) U.S. Cl.
CPC ................. *H05K 5/0217* (2013.01)

(58) Field of Classification Search
CPC ...... H05K 5/0217; G06F 1/1652; G09F 9/301
See application file for complete search history.

(56) References Cited

U.S. PATENT DOCUMENTS

| 7,559,163 B2 | 7/2009 | Ofuji et al. |
| 8,379,377 B2 * | 2/2013 | Walters ............... G06F 1/1641 361/679.04 |

(Continued)

FOREIGN PATENT DOCUMENTS

| CN | 113303612 A | 8/2021 |
| JP | 2005-249828 A | 9/2005 |
| KR | 10-0929967 B1 | 12/2009 |
| KR | 10-1110161 B1 | 1/2012 |

(Continued)

OTHER PUBLICATIONS

International Search Report (PCT/ISA/210) issued Jul. 31, 2023 by the International Searching Authority in counterpart International patent Application No. PCT/KR2023/006046.
Written Opinion (PCT/ISA/237) issued Jul. 31, 2023 by the International Searching Authority in counterpart International patent Application No. PCT/KR2023/006046.

*Primary Examiner* — Sagar Shrestha
(74) *Attorney, Agent, or Firm* — Sughrue Mion, PLLC

(57) ABSTRACT

A display apparatus includes a display including an upper region, a lower region, and an intermediate region; a first roller around which the upper region of the display is to be rolled; a second roller around which the lower region of the display is to be rolled; a first drum rotatably supporting the first roller; a second drum rotatably supporting the second roller; a main body disposed between the first drum and the second drum in which the intermediate region is disposed on a front surface of the main body; a first link connecting a left end of the first drum and a right end of the second drum and is rotatably connected to the main body; a second link connecting a right end of the first drum and a left end of the second drum and is rotatably connected to the main body; and a driver configured to rotate the first link and the second link in opposite directions, and the first drum includes first roller grooves to which the first roller is rotatably coupled, and the second drum includes second roller grooves to which the second roller is rotatably coupled.

20 Claims, 14 Drawing Sheets

(56) References Cited

U.S. PATENT DOCUMENTS

| | | | |
|---|---|---|---|
| 9,864,412 B2* | 1/2018 | Park | G06F 1/1652 |
| 9,874,905 B2* | 1/2018 | Song | G06F 1/1652 |
| 9,911,369 B2 | 3/2018 | Kim et al. | |
| 10,499,515 B2* | 12/2019 | Lee | G06F 1/1624 |
| 10,777,102 B2 | 9/2020 | Cho | |
| 11,480,241 B2 | 10/2022 | Eom | |
| 2005/0041012 A1* | 2/2005 | Daniel | G09F 9/301 |
| | | | 345/156 |
| 2006/0267926 A1* | 11/2006 | Chen | G06F 3/0395 |
| | | | 345/156 |
| 2007/0180745 A1* | 8/2007 | Ofuji | G03B 21/58 |
| | | | 40/601 |
| 2014/0247544 A1* | 9/2014 | Ryu | G09F 15/0062 |
| | | | 361/679.01 |
| 2015/0116921 A1* | 4/2015 | Hsu | G06F 1/1624 |
| | | | 361/679.27 |
| 2016/0034000 A1* | 2/2016 | Lee | G06F 1/1652 |
| | | | 361/749 |
| 2016/0320804 A1* | 11/2016 | Takayanagi | H04M 1/0268 |
| 2016/0353588 A1* | 12/2016 | Kim | G09F 15/0025 |
| 2017/0060183 A1* | 3/2017 | Zhang | G06F 1/1605 |
| 2018/0014415 A1* | 1/2018 | Choi | H05K 5/0247 |
| 2018/0077808 A1* | 3/2018 | Seo | G06F 3/04164 |
| 2019/0387633 A1* | 12/2019 | Liao | H05K 5/0017 |
| 2020/0022269 A1* | 1/2020 | Liao | H05K 5/0226 |
| 2020/0135064 A1* | 4/2020 | Lee | G06F 1/1684 |

FOREIGN PATENT DOCUMENTS

| | | |
|---|---|---|
| KR | 10-2012-0014872 A | 2/2012 |
| KR | 10-1649097 B1 | 8/2016 |
| KR | 10-2016-0140036 A | 12/2016 |
| KR | 10-2020-0004003 A | 1/2020 |
| KR | 10-2020-0080020 A | 7/2020 |
| KR | 10-2390738 B1 | 4/2022 |
| WO | 2021/080223 A1 | 4/2021 |

* cited by examiner

DISPLAY APPARATUS

CROSS-REFERENCE TO RELATED APPLICATIONS

This is a bypass continuation of International Application No. PCT/KR2023/006046, filed on May 3, 2023, in the Korean Intellectual Property Receiving Office, which is based on and claims priority to Korean Patent Application No. 10-2022-0095668, filed on Aug. 1, 2022, in the Korean Intellectual Property Office, the disclosures of which are incorporated by reference herein in their entireties.

BACKGROUND

1. Field

The disclosure relates to a display apparatus and, more particularly, to a rollable display that may be unrolled or rolled upwardly or downwardly.

2. Description of Related Art

A rollable display of which display may be freely unrolled and rolled has been developed with the development of technology, and when a user uses a display apparatus, the rollable display is used by unrolling the display, and when the user does not use the display apparatus, the display may be wound around a roll and stored inside a drum unit.

In order to increase a size of a rollable display, a size and weight of a drum accommodating a display need to be increased, which gives a restriction in installation and movement of the display apparatus.

In addition, when the size of the display becomes large, there has been a problem in that an external power source for controlling the display is necessary, and thus unnecessary power is consumed and a power source having a long lifespan is required.

SUMMARY

According to an aspect of the disclosure, a display apparatus includes a display comprising an upper region, a lower region, and an intermediate region; a first roller around which the upper region of the display is rolled; a second roller around which the lower region of the display is rolled; a first drum rotatably supporting the first roller; a second drum rotatably supporting the second roller; a main body disposed between the first drum and the second drum in which the intermediate region is disposed on a front surface of the main body; a first link connecting a left end of the first drum and a right end of the second drum and is rotatably connected to the main body; a second link connecting a right end of the first drum and a left end of the second drum and is rotatably connected to the main body; and a driver rotating the first link and the second link in an opposite direction, and the first drum includes first roller grooves to which the first roller is rotatably coupled, and wherein the second drum comprises second roller grooves to which the second roller is rotatably coupled.

A left end of the first link may be slidably supported by the first drum and a right end of the first link may be slidably supported by the second drum, and a left end of the second link may be slidably supported by the second drum and a right end of the second link may be slidably supported by the first drum.

The first link may include first and second protrusions respectively formed at the left end and the right end of the first link, and the second link comprises first and second protrusions respectively formed at the left end and the right end of the second link, the first drum may include first and second grooves respectively formed at the left end and the right end of the first drum, the first protrusion of the first link may be accommodated in the first groove of the first drum, and the second protrusion of the second link may be accommodated in the second groove of the first drum, and the second drum may include first and grooves respectively formed at the left end and the right end of the second drum, the first protrusion of the second link may be accommodated in the first groove of the second drum, and the second protrusion of the first link may be accommodated in the second groove of the second drum.

The driver may include a first arm of which one end is connected to a point adjacent to a center of the first link; a second arm of which one end is connected to a point adjacent to the center of the second link; a first slider rotatably connecting the other end of the first arm and the other end of the second arm and disposed on a left side of the first arm and a left side of the second arm; and a first driving motor for moving the first slider to the left and the right.

The driver may further include a third arm of which one end is connected to a point adjacent to the center of the second link; a fourth arm of which one end is connected to a point adjacent to the center of the first link; a second slider rotatably connecting the other end of the third arm and the other end of the fourth arm and disposed on a right side of the third arm and a right side of the fourth arm; and a second driving motor moving the second slider to left and right directions.

The first link may include a first support rib protruding forward to support a rear surface of the display, and the second link may include a second support rib protruding forward to support the rear surface of the display.

The first support rib may be formed along a length direction of the first link, and the second support rib may be formed along a length direction of the second link.

A sum of a weight of the first roller and a weight of the first drum may be greater than a sum of a weight of the second roller and a weight of the second drum.

The second link may further include an accommodation groove formed in a central portion connected to the main body, and the first link may have a central portion connected to the main body so as to rotate on a same plane as the second link.

The display apparatus may further include a processor configured to control the driver to be in a first state in which the upper region is completely accommodated in the first drum and the lower region is completely accommodated in the second drum or a second state in which the upper region and the lower region are exposed to the outside.

The display apparatus may further include a processor to control the driver to be withdrawn in response to an aspect ratio output by the display.

Each of the first roller and the second roller may have a cylindrical shape and further include a plurality of support parts protruding along a longitudinal direction of the first roller and the second roller on an outer circumferential surface of a cylindrical shape.

The display apparatus may further include a bracket to fix a side of the first drum and a side of the second drum.

The display apparatus may further include a wall mount coupled to a rear surface of the main body to fix the display apparatus to a wall surface.

The display apparatus may further include a printed circuit board (PCB) accommodated in the main body; and a cable electrically connecting the PCB and at least one of an upper end and a lower end of the display.

According to an aspect of the disclosure, a display apparatus includes a display including an upper region, a lower region, and an intermediate region; a first drum for accommodating the upper region; a second drum for accommodating the lower region; a main body disposed between the first drum and the second drum; a first link connecting a left end of the first drum and a right end of the second drum and rotatably connected to the main body; a second link connecting a right end of the first drum and a left end of the second drum and rotatably connected to the main body; and a driver configured to rotate the first link and the second link in opposite directions, the driver is further configured to rotate the first link and the second link so that the display is disposed in a mode among a plurality of modes, and the plurality of modes include a first mode in which the upper region is completely accommodated in the first drum and the lower region is completely accommodated in the second drum, a second mode in which the upper region and the lower region are completely exposed to an outside and a third mode in which a portion of the upper region is accommodated in the first drum and a portion of the lower region is accommodated in the second drum.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Examples described hereinafter are for easy understanding of the disclosure, and it should be understood that various changes may be made to examples described herein and the disclosure may be embodied in different forms. In addition, in the following description, detailed descriptions of well-known functions or configurations will be omitted since they would unnecessarily obscure the subject matters of the disclosure. In addition, it should be noted that the drawings as attached are just for easy understanding of the disclosure, and are not illustrated as really scaled, and dimensions of some elements may be exaggerated.

The terms used in the present specification and the claims are general terms identified in consideration of the functions of the various embodiments of the disclosure. However, these terms may vary depending on intention, legal or technical interpretation, emergence of new technologies, and the like of those skilled in the related art. Also, there may be some terms arbitrarily identified by the applicant. Unless there is a specific definition of a term, the term may be construed based on the overall contents and technological common sense of those skilled in the related art.

Terms "include" or "formed of" used in the present specification specify the presence of features, numerals, steps, operations, components, parts, or combinations thereof mentioned in the present specification, but do not preclude the presence or addition of one or more other features.

Terms such as first and second may be used to describe various components, but the components should not be limited by the terms. The terms may be used only for the purpose of distinguishing one component from another component. For example, without departing from the scope of the disclosure, the first component may be referred to as the second component, and similarly the second component may also be referred to as the first component.

In addition, terms such as "front end", "back end", "upper portion," "lower portion", "upper end", "lower end," or the like, used in the disclosure are defined based on the drawings, and by each term, the shape and location of each component is not limited.

In the disclosure, components required for the description of each embodiment of the disclosure are described and thus, the embodiment is not necessarily limited thereto. Accordingly, some components may be changed or omitted and other components may be added. In addition, components may be disposed and arranged in different independent devices.

Further, embodiments of the disclosure are described in detail with reference to the accompanying drawings and the contents disclosed in the accompanying drawings, but the disclosure is not limited or restricted by embodiments.

Hereinbelow, the disclosure will be described in detail with reference to FIGS. 1A and 1B.

Figure 1A:
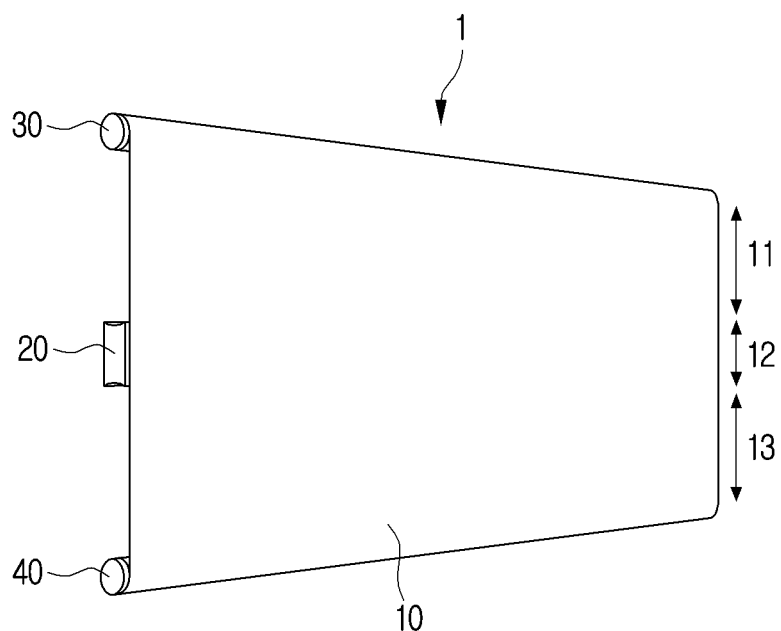
FIG. 1A is a front perspective view schematically illustrating a display apparatus according to various embodiments of the disclosure when the display apparatus is driven.
Figure 1B:
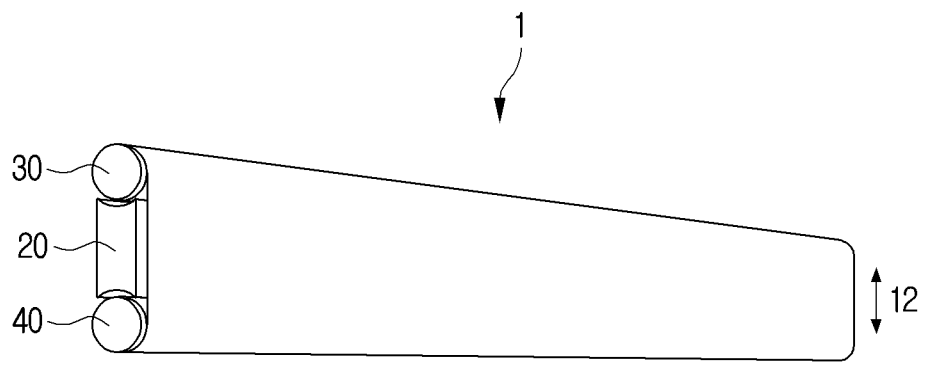
FIG. 1B is a front perspective view schematically showing a display apparatus according to various embodiments of the disclosure when the display apparatus is not driven.

FIG. 1A is a front perspective view schematically illustrating a display apparatus according to various embodiments of the disclosure when the display apparatus is driven; and FIG. 1B is a front perspective view schematically showing a display apparatus according to various embodiments of the disclosure when the display apparatus is not driven.

The display apparatus 1 may be a part of an electronic apparatus including an image display function, furniture, or building/structure. For example, the display apparatus 1 may include at least one of a television, a digital video disk (DVD) player, a smartphone, a desktop personal computer (PC), a tablet PC, a laptop PC, a personal digital assistant (PDA), portable multimedia player (PMP), an MP3 player, a mobile medical device, a camera, a wearable device (a wearable device, electronic glasses, a smart watch, etc.), TV box (e.g., SAMSUNG HOMESYNC™, APPLE TV™, or GOOGLE TV™), game consoles, electronic board, an electronic signature receiving device, a projector, any of various measuring devices (e.g., water, electricity, gas, or electromagnetic wave measuring devices, or the like).

When the display apparatus 1 is driven, a display 10 is unrolled to display an image on the display 10, and when the display apparatus 1 is not driven, an image may be displayed only in a partial region of the display 10.

Hereinafter, the display apparatus will be described in detail with reference to FIGS. 2A to 5.

Figure 2A:
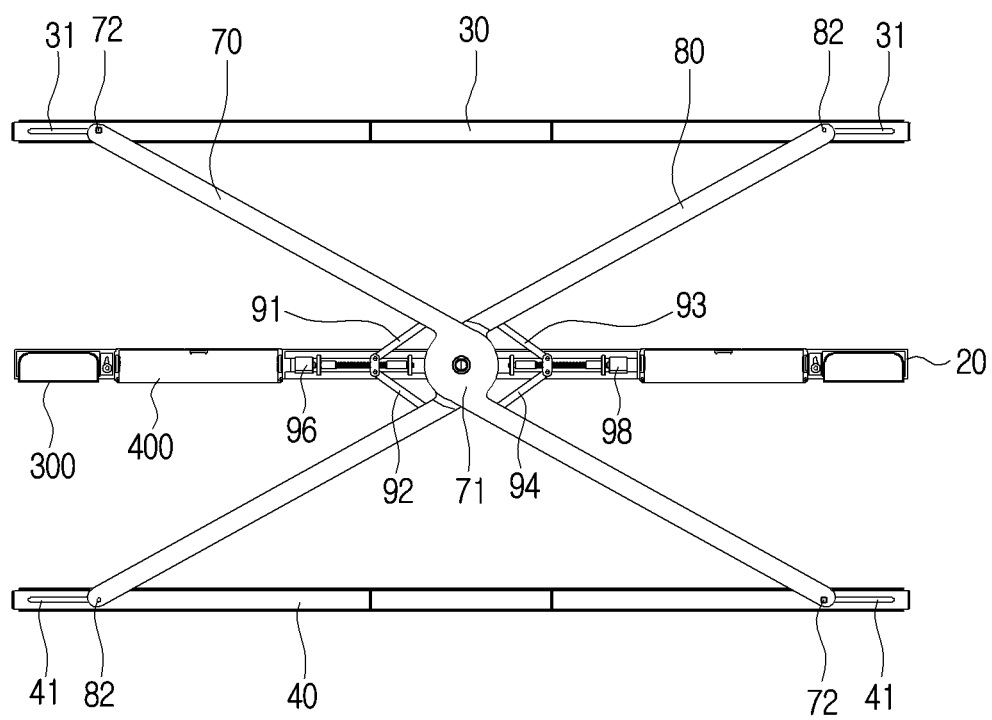
FIG. 2A is a rear view of a display apparatus according to various embodiments of the disclosure when the display apparatus is driven.
Figure 2B:
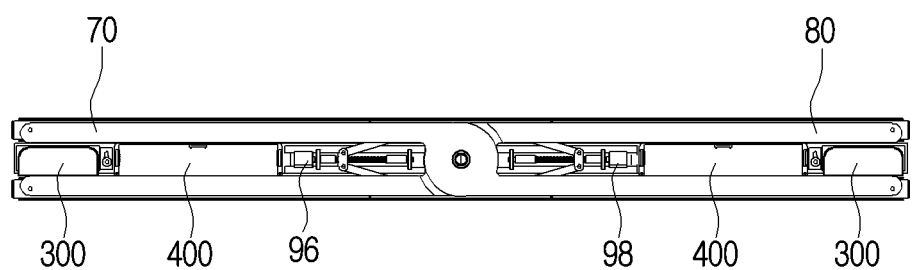
FIG. 2B is a rear view of a display apparatus according to various embodiments of the disclosure when the display apparatus is not driven.
Figure 3A:
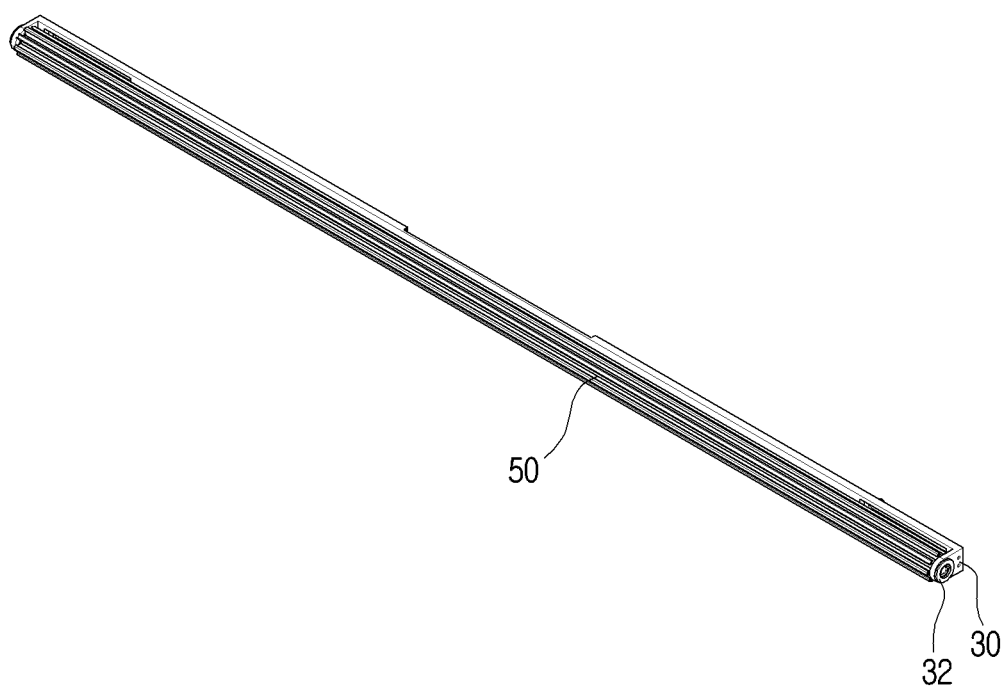
FIG. 3A is a front perspective view of a first roller of a display apparatus according to various embodiments of the disclosure.
Figure 3B:
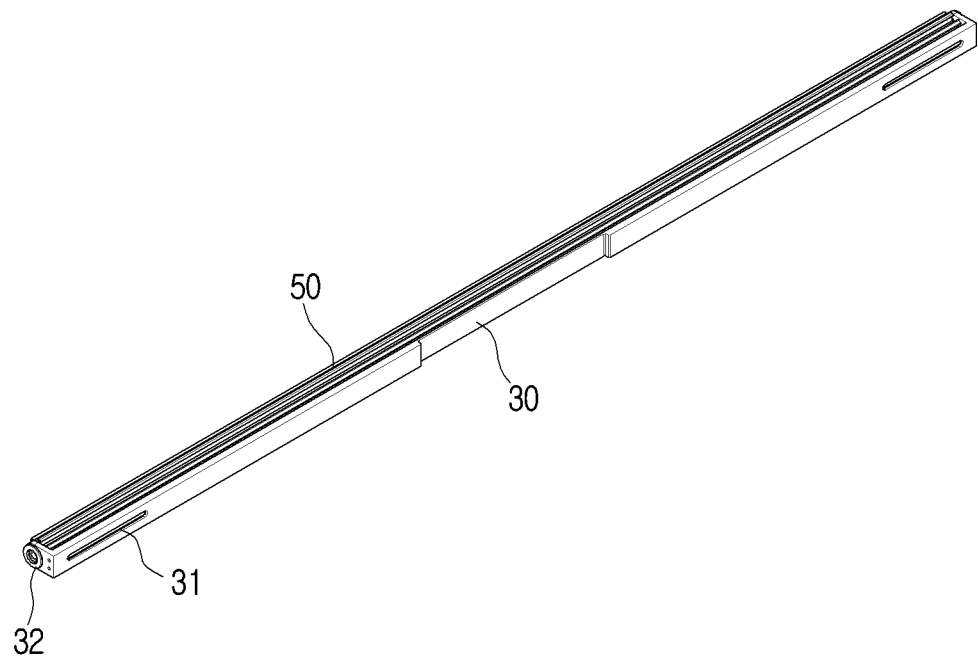
FIG. 3B is a rear perspective view of the first roller of the display apparatus according to various embodiments of the disclosure.
Figure 4A:
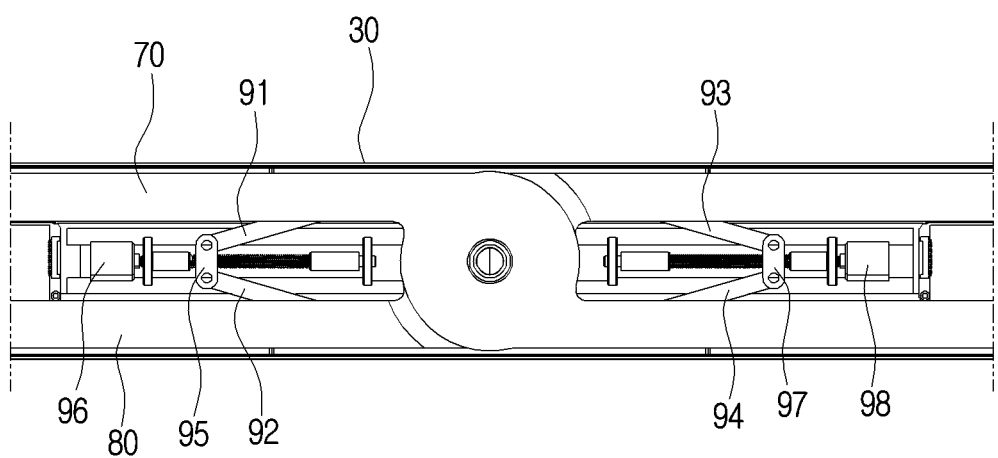
FIG. 4A is an enlarged view of a driver of the display apparatus shown in FIG. 2B.
Figure 4B:
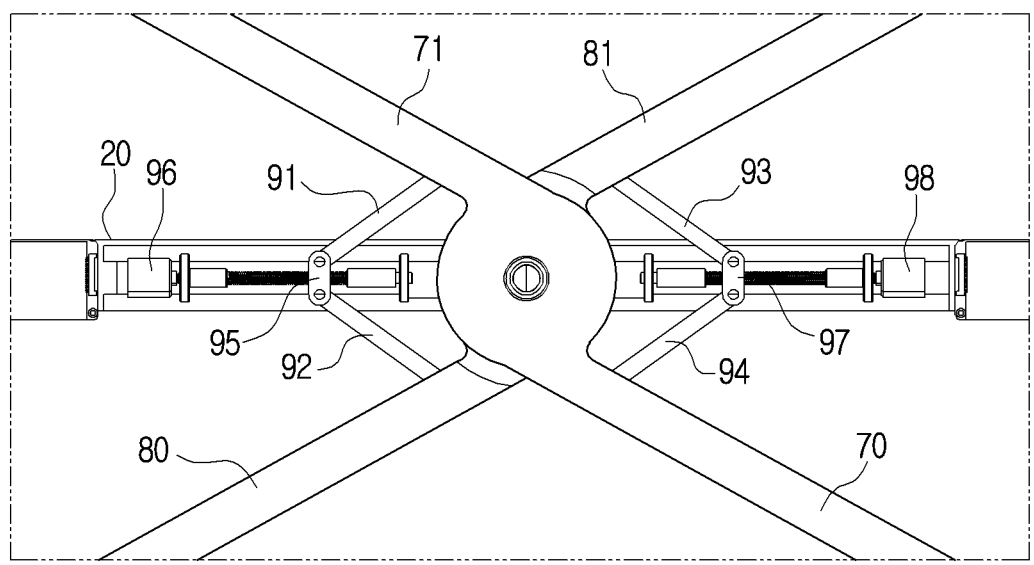
FIG. 4B is an enlarged view of a driver of the display apparatus shown in FIG. 2A.
Figure 5:
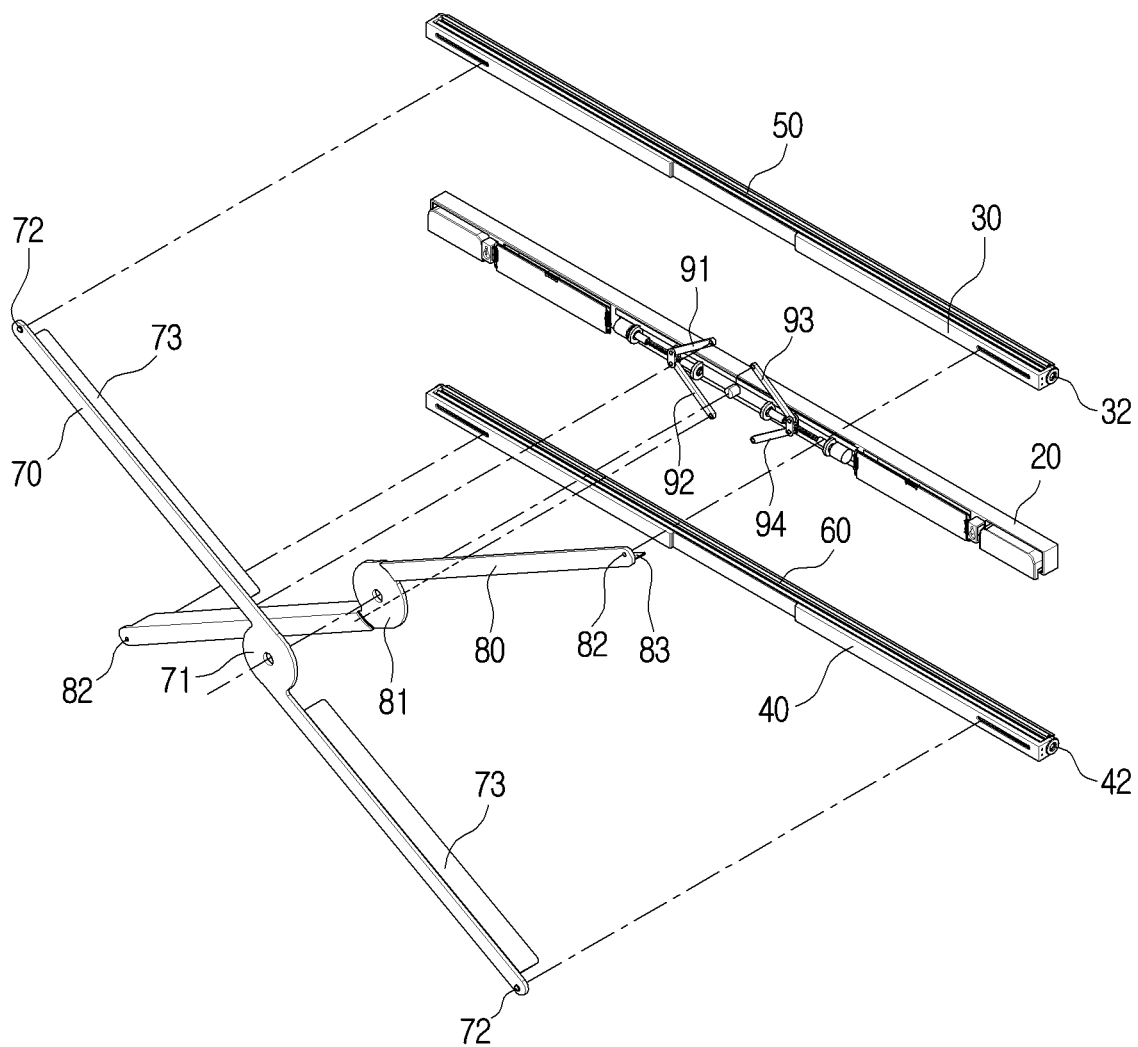
FIG. 5 is an exploded perspective view of a display apparatus according to various embodiments of the disclosure.

FIG. 2A is a rear view of the display apparatus 1 according to various embodiments of the disclosure when the display apparatus 1 is driven; FIG. 2B is a rear view of the display apparatus 1 according to various embodiments of the disclosure when the display apparatus 1 is not driven; FIG. 3A is a front perspective view of a first roller 50 according to various embodiments of the disclosure; FIG. 3B is a rear perspective view of the first roller 50 according to various embodiments of the disclosure; FIG. 4A is an enlarged view of a driver 90 of the display apparatus 1 shown in FIG. 2B; FIG. 4B is an enlarged view of the driver 90 of the display apparatus 1 shown in FIG. 2A; and FIG. 5 is an exploded perspective view of the display apparatus 1 according to various embodiments of the disclosure.

Figure 7:
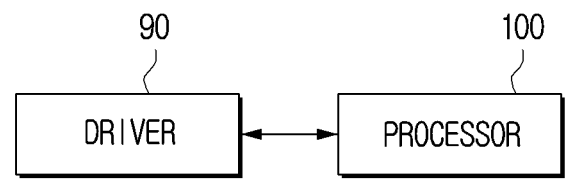
FIG. 7 is a block diagram illustrating a controlling process of a processor of a display apparatus according to various embodiments of the disclosure.

The display apparatus 1 according to various embodiments of the disclosure may include the display 10, a first roller 50, a second roller 60, a first drum 30, a second drum 40, a main body 20, a first link 70, a second link 80, and a driver 90 (e.g., FIG. 7).

The display 10 may display various contents (e.g., text, images, videos, icons, symbols, etc.) to a user. The display 10 may include, for example, a liquid crystal display (LCD), a light-emitting diode (LED) display, an organic light-emitting diode (OLED) display, a microelectromechanical systems (MEMS) display, an electronic paper display, or a flexible display in which the display unit is bent or curved.

Referring back to FIGS. 1A and 1B, the display 10 may include an upper region 11, a lower region 13, and an intermediate region 12. The boundary between the upper region 11, the lower region 13, and the intermediate region 12 of the display 10 is not separately distinguished.

The upper region 11 may be wound around the first roller 50 and accommodated in the first drum 30. One end of the upper region 11 may be electrically connected to a printed circuit board (PCB) 400 through a cable. The lower region 13 may be wound around the second roller 60 and accommodated in the second drum 40. One end of the lower region 13 may be electrically connected to the PCB 400 through a cable.

An image may always be displayed on the intermediate region 12. The intermediate region 12 is not received in the first roller 50 and the second roller 60. The intermediate region 12 may be arranged between the upper region 11 and the lower region 13. The intermediate region 12 may be disposed on the front surface of the driver 90. Even when the display apparatus 1 is not driven, an image previously set by the user may be displayed in the intermediate region 12. The intermediate region 12 may be turned on/off as necessary.

The upper region 11 of the display 10 may be wound around the first roller 50. The first roller 50 may rotate such that a surface of the display 10 on which an image of the display 10 is output faces outward. The first roller 50 may be coupled to a first roller groove 32 of the first drum 30. The first roller 50 may rotate in combination with the first roller groove 32. A portion of the upper portion of the upper region of the display 10 may be inserted into the first roller 50. A length in a longitudinal direction of the first roller 50 may be equal to or greater than a horizontal length of the display 10.

The lower region 13 of the display 10 may be wound around the second roller 60. The second roller 60 may rotate such that a surface of the display 10 on which an image of the display 10 is output faces outward. The second roller 60 may be coupled to a second roller groove 42 of the second drum 40. The second roller 60 may rotate in combination with the second roller groove 42. A portion of a lower region 13 of the display 10 may be inserted into the second roller 60. A length in a longitudinal direction of the second roller 60 may be equal to or greater than a horizontal length of the display 10.

The first drum 30 may move upward or downward at an upper side of the main body 20. The first drum 30 may be supported by the first link 70 and the second link 80 to move upward, or move downward in the direction of the main body 20 by the first link 70 and the second link 80 to be accommodated in the rear surface of the main body 20. When the first drum 30 moves upward, the upper region 11 of the display 10 connected to the first roller 50 accommodated in the first drum 30 may be unrolled. When the first drum 30 moves downward, the upper region 11 of the display 10 connected to the first roller 50 accommodated in the first drum 30 may be wound around the first roller 50. The first drum 30 may move in parallel with the main body 20.

The second drum 40 may move upward and downward at the lower side of the main body 20. The second drum 40 may be supported by the first link 70 and the second link 80 and moves upward in the direction of the main body 20 to be accommodated in the rear surface of the main body 20 or move downward to the lower side of the main body 20. When the second drum 40 moves downward, the lower region 13 of the display 10 connected to the second roller 60 accommodated in the second drum 40 may be unrolled. When the second drum 40 moves upward, the lower region 13 of the display 10 connected to the second roller 60 accommodated in the second drum 40 may be wound around the second roller 60. The second drum 40 may move in parallel with the main body 20.

The first drum 30 and the second drum 40 may move upward and downward in a same plane. The first drum 30 and the second drum 40 may move upward and downward in parallel. When the first drum 30 moves upward, the second drum 40 may move upward or downward, and when the first drum 30 moves upward, the second drum 40 may move upward or downward.

The first drum 30 and the second drum 40 may include grooves 31 and 41 at the left and right ends, respectively. Referring to FIG. 2A, a left end and a right end of each of the first drum 30 and the second drum 40 are defined with reference to the display apparatus 1 illustrated in FIG. 2A.

The grooves 31 and 41 may be formed on the rear surfaces of the first drum 30 and the second drum 40. Protrusions 72 and 82 of the first link 70 and the second link 80 may move in the grooves 31 and 41 leftward and rightward. While the grooves 31 and 41 and the protrusions 72 and 82 are connected, the first drum 30 and the second drum 40 may be supported by the first link 70 and the second link 80.

The first drum 30 and the second drum 40 may include first roller grooves 32 and second roller grooves 42 on both sides to which the first roller 50 and the second roller 60 are coupled, respectively. The first roller groove 32 is shown in a circular shape, but the first roller groove 32 is formed to correspond to a shape of the first roller 50, and the shape is not limited thereto and may be diverse. The second roller groove 42 may be in a circular shape, but the second roller groove 42 may be formed to correspond to a shape of the second roller 60, and the shape of the second roller groove 42 is not limited thereto and may be diverse.

The first drum 30 and the second drum 40 are illustrated in a shape that all the directions are open except a rear surface in which the grooves 31 and 41 are connected to the protrusions 72 and 82, but the shape is not limited thereto and the shapes may be diverse.

The display apparatus 1 includes the first drum 30 and the second drum 40 to divide and accommodate the display 10, thereby reducing the size and thickness of the display apparatus 1. In addition, since the display 10 is divided and accommodated in the first drum 30 and the second drum 40, a larger display 10 may be provided.

The main body 20 may accommodate a speaker 300, a printed circuit board (PCB) 400, and the driver 90. The intermediate region 12 of the display 10 may be disposed on the front surface of the main body 20. The main body 20 may accommodate the first drum 30 and the second drum 40. The main body 20 is illustrated as a rectangular parallelepiped, but is not limited thereto, and may have various shapes and sizes.

When an image is output from the display 10, the speaker 300 may output sound such as music and voice corresponding to the image. The speaker 300 may be disposed at both ends of the main body 20, respectively.

The PCB 400 may be electrically connected to the display 10. The PCB 400 may be electrically connected to the display 10 through a cable. The PCB 400 may be electrically connected to at least one of an upper end and a lower end of the display 10 through the cable. The PCB 400 may be disposed at both ends of the main body 20, respectively.

Referring to FIG. 5, the first link 70 may include a central portion 71, a protrusion 72, and a first support rib 73. The first link 70 may support the first drum 30 and the second drum 40. The first link 70 may slidably support the first drum 30 and the second drum 40 right and left. The left and right ends of the first link 70 may support the first drum 30 and the second drum 40, respectively. The left and right ends of the first link 70 may be slidably supported on the first drum 30 and the second drum 40 left and right, respectively. The first link 70 may be connected to the first arm 91. The first link 70 may be connected to a fourth arm 94.

The central portion 71 of the first link 70 may be arranged in the middle of the longitudinal direction of the first link 70. The central portion 71 of the first link 70 may be rotatably coupled to the main body 20. The first link 70 may rotate with respect to the central portion 71. The central portion 71 of the first link 70 is illustrated as a circular shape, but is not limited thereto, and the shape thereof may vary.

The second link 80 may include an accommodation groove 81, a protrusion 82, and a second support rib 83. The second link 80 may support the first drum 30 and the second drum 40. The second link 80 may slidably support the first drum 30 and the second drum 40 left and right. The left and right ends of the second link 80 may support the second drum 40 and the first drum 30, respectively. The left and right ends of the second link 80 may be slidably supported on the second drum 40 and the first drum 30, respectively. The second link 80 may be connected with a second arm 92. The second link 80 may be connected to a third arm 93.

The accommodation groove 81 of the second link 80 may be formed in the middle of the longitudinal direction of the second link 80. The accommodation groove 81 may be rotatably connected to the main body 20. The central portion 71 may be accommodated in the accommodation groove 81. The central portion 71 and the accommodation groove 81 may be coupled to the main body 20 so as to rotate in opposite directions. Although the accommodation groove 81 is shown in a circular shape, the accommodation groove 81 is shown to correspond to the shape of the central portion 71, and the shape of the accommodation groove 81 is not limited thereto.

The first and second support ribs 73 and 83 may be formed to protrude forward to support a rear surface of the display 10. The first and second support ribs 73 and 83 may be formed along the longitudinal direction of the first and second links 70 and 80, respectively. The first and second support ribs 73 and 83 support the rear surface of the display 10 to prevent the display 10 from being uneven when the display 10 is unrolled. The first and second support ribs 73 and 83 are not limited to the illustrated shapes, and may have various shapes.

The protrusions 72 and 82 of the first link 70 and the second link 80 may be formed at the left and right ends of the first link 70 and the second link 80, respectively. The protrusions 72 and 82 of the first link 70 and the second link 80 may be formed perpendicular to the display 10 in the first link 70 and the second link 80, respectively. The diameters of the protrusions 72 and 82 of the first link 70 and the second link 80 may be smaller than the width of the grooves 31 and 41 of the first and second drums 30 and 40. The protrusions 72 and 82 of the first link 70 and the second link 80 are not limited to the illustrated shapes, and may have various shapes.

The first link 70 and the second link 80 form the central portion 71 and the accommodation groove 81, respectively, and thus the first link 70 and the second link 80 may rotate in the same plane. Since the first link 70 and the second link 80 rotate in the same plane, the first and second support ribs 73 and 83 respectively formed on the first link 70 and the second link 80 may uniformly support the display 10. The shapes of the first link 70 and the second link 80 are not limited to the illustrated shapes, and may have various shapes.

The driver 90 may include the first arm 91, the second arm 92, the third arm 93, the fourth arm 94, a first slider 95, a second slider 97, a first driving motor 96, and a second driving motor 98. The driver 90 is accommodated in the main body 20.

Each of one end of the first arm 91 and one end of the fourth arm 94 may be connected to a point adjacent to the center of the first link 70.

The other end of the first arm 91 may be rotatably connected to the first slider 95. The first arm 91 may be connected to a left part of a first link 70 adjacent to the central portion 71. The first arm 91 may be connected to the lower surface of the first link 70.

The other end of the fourth arm 94 may be rotatably connected to the second slider 97. The fourth arm 94 may be connected to a right portion of the first link 70 adjacent to the central portion 71. The fourth arm 94 may be connected to the upper surface of the first link 70.

Each of one end of the second arm 92 and one end of the third arm 93 may be connected to a point adjacent to the center of the second link 80.

The other end of the second arm 92 may be rotatably connected to the first slider 95. The second arm 92 may be connected to the left portion of the second link 80 adjacent to the accommodation groove 81. The second arm 92 may be connected to the upper surface of the second link 80.

The other end of the third arm 93 may be rotatably connected to the second slider 97. The third arm 93 may be connected to the right portion of the second link 80 adjacent to the accommodation groove 81. The third arm 93 may be connected to the lower surface of the second link 80.

The first to fourth arms 91, 92, 93 and 94 are not limited to the illustrated shape, and the shape may vary.

The first slider 95 may be rotatably connected to the other end of the first arm 91. The first slider 95 may be rotatably connected to the other end of the second arm 92. The first slider 95 may be arranged on the left side of the first arm 91. The first slider 95 may be arranged on the left side of the second arm 92. The first slider 95, the first arm 91, and the second arm 92 may be connected in the same plane.

The second slider 97 may be rotatably connected to the other end of the third arm 93. The second slider 97 may be rotatably connected to the other end of the fourth arm 94. The second slider 97 may be arranged on the right side of the third arm 93. The second slider 97 may be arranged on the right side of the fourth arm 94. The second slider 97, the third arm 93, and the fourth arm 94 may be connected in the same plane.

The first driving motor 96 may move the first slider 95 left and right. When the first slider 95 moves to the right by the first driving motor 96, the first arm 91 connected to the first slider 95 may rotate counterclockwise, and the second arm 92 may rotate clockwise. That is, the first link 70 connected to the first arm 91 may rotate clockwise, and the second link 80 connected to the second arm 92 may rotate counterclockwise. Referring to FIG. 2A, a counterclockwise direction and a clockwise direction are defined based on the display apparatus 1 shown in FIG. 2A.

When the first slider 95 moves to the left by the first driving motor 96, the first arm 91 connected to the first slider 95 may rotate clockwise, and the second arm 92 may rotate counterclockwise. That is, the first link 70 connected to the first arm 91 may rotate counterclockwise, and the second link 80 connected to the second arm 92 may rotate clockwise.

When the first arm 91 rotates clockwise, the one end of the first arm 91 connected to the first link 70 may move downward. When the first arm 91 rotates counterclockwise, the one end of the first arm 91 connected to the first link 70 may move upward.

When the second arm 92 rotates clockwise, the one end of the second arm 92 connected to the second link 80 may move downward. When the second arm 92 rotates counterclockwise, the one end of the second arm 92 connected to the second link 80 may move upward.

When the third arm 93 rotates clockwise, the one end of the third arm 93 connected to the second link 80 may move upward. When the third arm 93 rotates counterclockwise, the one end of the third arm 93 connected to the second link 80 may move downward.

When the fourth arm 94 rotates clockwise, the one end of the fourth arm 94 connected to the first link 70 may move upward. When the fourth arm 94 rotates counterclockwise, the one end of the fourth arm 94 connected to the first link 70 may move downward.

The second driving motor 98 may move the second slider 97 left and right. When the second slider 97 moves to the left by the second driving motor 98, the third arm 93 connected to the second slider 97 may rotate clockwise, and the fourth arm 94 may rotate counterclockwise. That is, the second link 80 connected to the third arm 93 may rotate counterclockwise, and the first link 70 connected to the fourth arm 94 may rotate clockwise.

When the second slider 97 moves to the right by the second driving motor 98, the third arm 93 connected to the second slider 97 may rotate counterclockwise, and the fourth arm 94 may rotate clockwise. That is, the second link 80 connected to the third arm 93 may rotate clockwise, and the first link 70 connected to the fourth arm 94 may rotate counterclockwise.

When the first link 70 rotates clockwise and the second link 80 rotates counterclockwise, the first drum 30 connected to the left end of the first link 70 and the right end of the second link 80 may move upward, the second drum 40 connected to the right end of the first link 70 and the left end of the second link 80 may move downward. The protrusions 72 formed at the left and right ends of the first link 70 may be slid to the right and the left, respectively. The protrusions 82 formed at the left and right ends of the second link 80 may be slid to the right and the left, respectively.

When the first link 70 rotates counterclockwise and the second link 80 rotates clockwise, the first drum 30 connected to the left end of the first link 70 and the right end of the second link 80 move downward, and the second drum 40 connected to the right end of the first link 70 and the left end of the second link 80 may move upward. The protrusions 72 formed at the left and right ends of the first link 70 may be slid to the left and the right, respectively. The protrusions 82 formed at the left and right ends of the second link 80 may be slid to the left and the right, respectively.

When the first link 70 rotates clockwise, the left end of the first link 70 move upward and the right end of the first link 70 may move downward. When the first link 70 rotates counterclockwise, the left end of the first link 70 may move downward and the right end of the first link 70 may move upward. When the second link 80 rotates clockwise, the left end of the second link 80 may move upward and the right end of the second link 80 may move downward. When the second link 80 rotates counterclockwise, the left end of the second link 80 may move downward and the right end of the second link 80 may move upward.

The first and second drive motors 96 and 98 may be linear motors. However, the types of the first and second driving motors 96 and 98 are not limited thereto. In addition, the driving motors 96 and 98 of the display apparatus 1 are directly connected to the central part 71 or the accommodation groove 81 to directly rotate the first link 70 and the second link 80.

Hereinbelow, the principle of driving of the display apparatus 1 will be further described with reference to FIG. 6.

Figure 6:
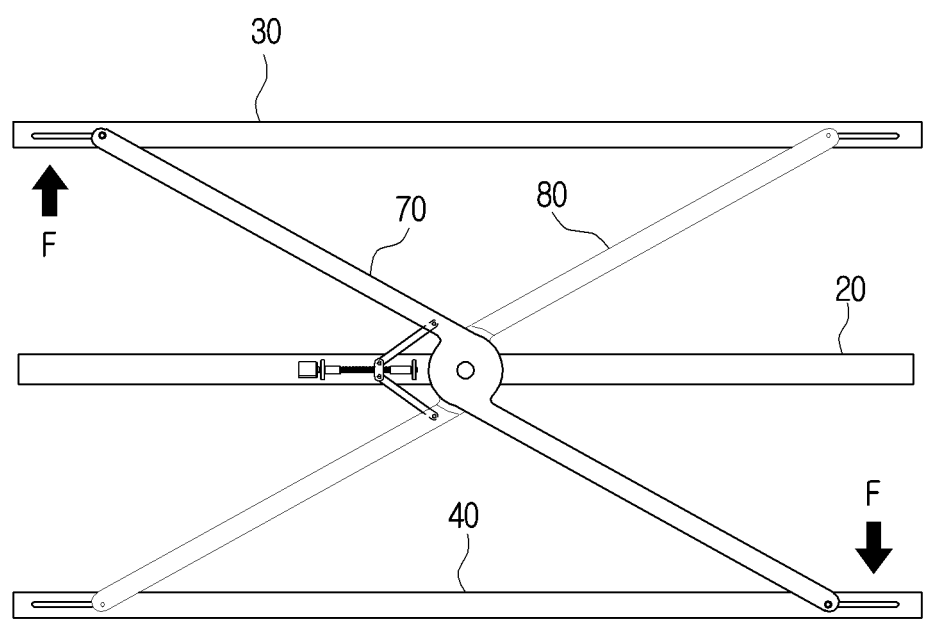
FIG. 6 is a diagram illustrating a driving principle of a display apparatus according to various embodiments of the disclosure.

FIG. 6 is a diagram illustrating a driving principle of the display apparatus 1 according to various embodiments of the disclosure.

The display apparatus 1 includes the driving motors 96 and 98, but unnecessary power consumption may be reduced by adjusting the weight of the first drum 30 and the weight of the second drum 40.

Specifically, the first link 70 may connect a left end of the first drum 30 and a right end of the second drum 40, and the second link 80 may connect a right end of the first drum 30 and a left end of the second drum 40. In addition, the first link 70 and the second link 80 may be rotatably coupled to each other by the rotary shaft of the main body 20. Therefore, the second drum 40 and the second roller 60 apply a load in a downward direction of the right end of the first link 70 with respect to the rotation axis, thereby generating a clockwise torque force. The left end of the first link 70 applies a force in a direction in which the first drum 30 and the first roller 50 are lifted by a clockwise torque force. Meanwhile, the second drum 40 and the second roller 60 apply a load in a downward direction of the left end of the second link with respect to the rotation axis, thereby generating a counterclockwise torque force. By the counterclockwise torque force, the right end of the second link 80 applies a force in a direction in which the first drum 30 and the first roller 50 are lifted. As such, when the second link 80 moves downward through the self-weight due to the weight of the second drum 40 and the second roller 60, the first drum 30 and the first roller 50 may be pushed up with a force corresponding thereto. Through this structure, the size of the display 10 may be adjusted with a small force of the driving motors 96 and 98. It is possible to reduce the amount of power unnecessarily consumed by the drive motors 96 and 98. In addition, since the size of the display 10 may be adjusted with a small force of the driving motors 96 and 98, the lifespan of the driving motors 96 and 98 may be shortened and applied to the display apparatus 1. Without having to have a plurality of driving motors 96 and 98, the weight of the main body 20 is reduced to be combined with the main body 20 to reduce a load applied to a wall mount 500 for fixing the display apparatus 1 to a wall surface or the like. The weight of the main body 20 and the load of the display apparatus 1 are reduced so that the display apparatus 1 may be easily moved. The driver 90 may include only the first arm 91, the second arm 92, the first slider 95, and the first driving motor 96, or may include only the third arm 93, the fourth arm 94, the second slider 97, and the second driving motor 98. A left end, a right end, a clockwise direction, and a counterclockwise direction are defined with respect to the display apparatus 1 shown in FIG. 6.

When the sum of the weight of the first roller 50 and the weight of the first drum 30 and the sum of the weight of the second roller 60 and the weight of the second drum 40 are the same, the second drum 40 and the second roller 60 may freely move downward so that the first and second drums 30 and 40 cannot be fixed without control of the driving motors 96 and 98. Therefore, in order to fix the first and second drums 30 and 40 without control of the driving motors 96 and 98, a sum of the weight of the first roller 50 and the weight of the first drum 30 may be greater than a sum of the weight of the second roller 60 and the weight of the second drum 40.

A control method of the processor 100 of the disclosure will be described in more detail with reference to FIG. 7 below.

FIG. 7 is a block diagram illustrating a controlling process of the processor 100 of the display apparatus 1 according to various embodiments of the disclosure.

The display apparatus 1 may further include the processor 100 for controlling the driver 90.

The processor 100 may control overall operations of the display apparatus 100. The processor 100 may include at least one of a central processing unit (CPU), an application processor (AP), or a communication processor (CP). The processor 100 may be a micro control unit (MCU).

The processor 100 may control hardware or software components coupled to the processor 100 by driving an operating system or an application program, and may perform various data processing and operations. Further, the processor 100 may load and process commands or data received from at least one of the other components into a volatile memory and store the various data in a non-volatile memory.

The processor 100 may control the driver 90 to be in a first state in which the upper region 11 of the display 10 is completely accommodated in the first drum 30 and the lower region 13 is completely accommodated in the second drum 40, or a second state in which the upper region 11 and the lower region 13 are exposed to the outside.

The processor 100 may control the driver 90 to be withdrawn in response to an aspect ratio output by the display 10.

Specifically, the processor 100 may unroll the display 10 as necessary by a signal received from the outside through a remote controller or the like. The processor 100 may control the display 10 to be unrolled as much as the screen ratio. The processor 100 may control to output an image to the intermediate area 12 of the display 10 in a first state. In addition, the processor 100 may control the display 10 to be in a second state or a third state. In the second state, the upper region 11 and the lower region 13 are exposed to the outside, and both the upper region 11 and the lower region 13 may be in a full-view state in which the upper region 11 and the lower region 13 are exposed to the outside. The third state may be a mid-view state in which half of the upper region 11 and the lower region 13 are exposed. In addition, the processor 100 may control the user to adjust the size of the display 10.

Hereinbelow, with reference to FIG. 8, the first roller 50 and the second roller 60 of the disclosure will be described in detail.

Figure 8:
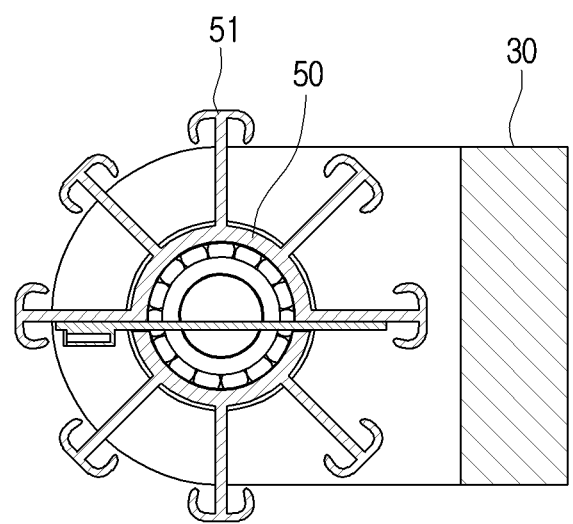
FIG. 8 is a cross-sectional view illustrating a shape of a first roller of a display apparatus according to various embodiments of the disclosure.

FIG. 8 is a cross-sectional view illustrating a shape of the first roller 50 according to various embodiments of the disclosure.

The first roller 50 may have a cylindrical shape. The first roller 50 may include a plurality of support parts 51 protruding along a longitudinal direction on an outer circumferential surface of a cylindrical shape. The display 10 may be wound in a circular shape by a plurality of support parts 51. The plurality of support parts 51 are not limited thereto, and as necessary, the number of support parts 51 may be increased or decreased, and the shapes of the support parts 51 may also vary. Although only the first roller 50 is shown in FIG. 8, the second roller 60 has the same shape and structure.

Hereinbelow, the display apparatus 1 will be described in detail with reference to FIG. 9.

Figure 9:
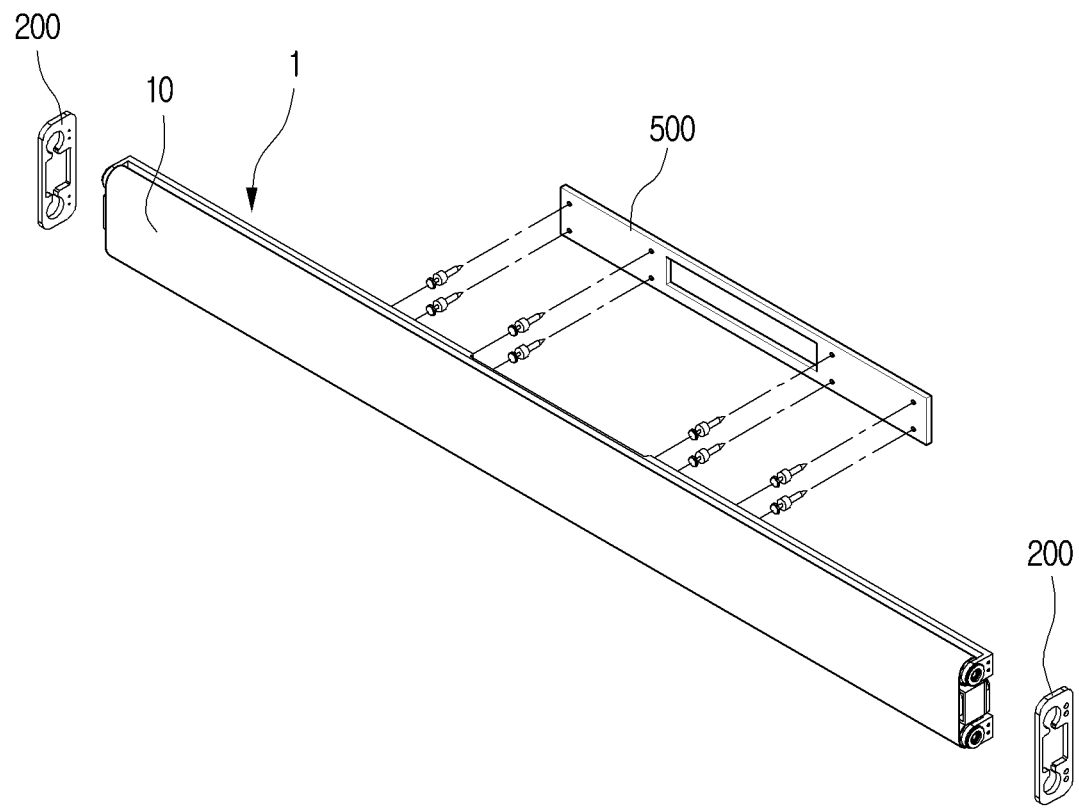
FIG. 9 is a view illustrating a coupling structure of a bracket and a wall mount of a display apparatus according to various embodiments of the disclosure.

FIG. 9 is a view illustrating a coupling structure of a bracket 200 and the wall mount 500 of the display apparatus 1 according to various embodiments of the disclosure.

The display apparatus 1 may include the bracket 200 and the wall mount 500.

The bracket 200 may fix a side of the first drum 30 and a side of the second drum 40. A plurality of brackets 200 are provided to fix both side surfaces of the first drum 30 and both side surfaces of the second drum 40. By fixing the first drum 30 and the second drum 40 to the bracket 200, the display apparatus 1 may be easily moved. The bracket 200 may reduce the load applied to the lower part of the display apparatus 1 by using not only the case of moving the display apparatus 1 but also even when the display apparatus 1 is not used for a long time.

The wall mount 500 may be coupled to the rear surface of the main body 20. The wall mount 500 may be coupled with a surface like a wall for installing the display apparatus 1 to fix the display apparatus 1. The wall mount 500 is provided to fix the display apparatus 1 to the wall surface, thereby driving the display 10 while maintaining the interior of the wall surface.

Hereinbelow, with reference to FIG. 10, a driving mode of the display apparatus 1 will be described in detail.

Figure 10:
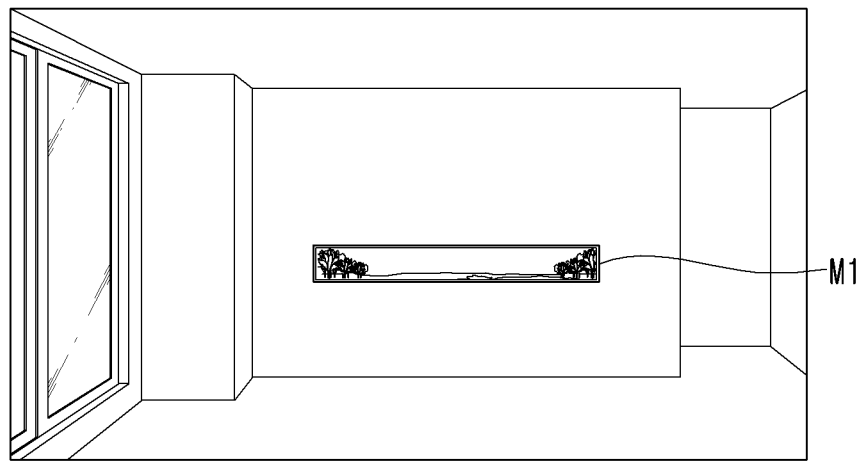
FIG. 10 is a diagram illustrating that a display apparatus according to various embodiments of the disclosure is implemented in a plurality of modes.
Figure 10:
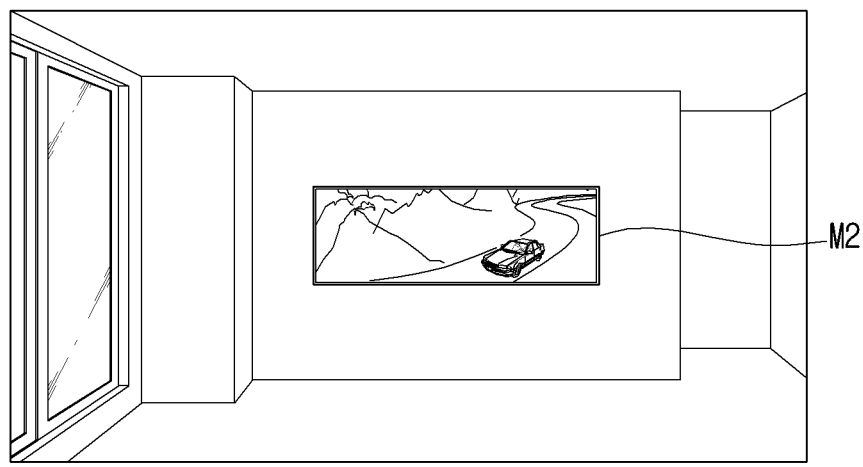
Figure 10:
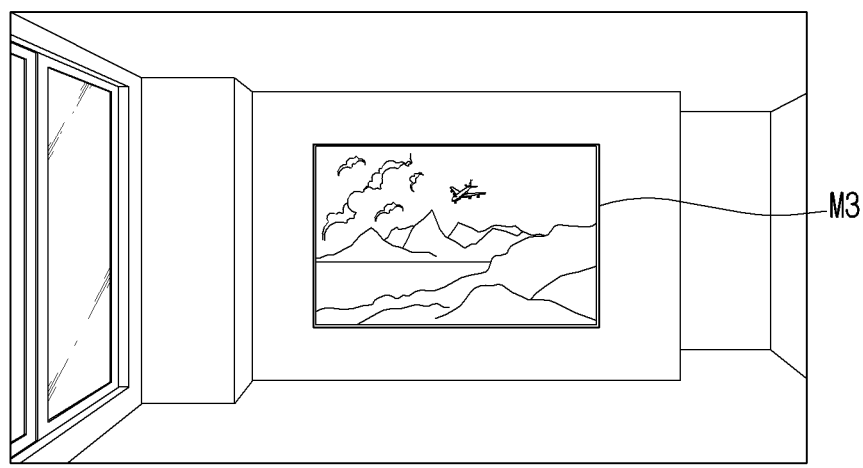

FIG. 10 is a diagram illustrating that a display apparatus according to various embodiments of the disclosure is implemented in a plurality of modes.

The plurality of modes may include a line-view mode M1, a mid-view mode M2 and a full-view mode M3. The display apparatus 1 of the disclosure includes the intermediate region 12 of display 10 which is always driven. The intermediate region 12 may always be driven, and may represent necessary information even when the upper region 11 and the lower region 13 of the display 10 are all accommodated in the first drum 30 and the second drum 40, respectively. When only the intermediate region 12 is driven, the upper region 11 and the lower region 13 are wound around the first roller 50 and the second roller 60, the first drum and the second drum 40 accommodating the first roller 50 and the second roller and the driver 90 are accommodated in the rear surface of the intermediate region 12 so that only the intermediate region 12 is exposed to the outside, giving attentional engagement for a screen. In the line view mode M1, only the middle region 12 is exposed to the outside, and in the mid-view mode M2, only half of the longitudinal length of each of the upper region 11 and the lower region 13 is vertically extended. In the full-view mode M3, the upper and lower regions 11 and 13 are vertically expanded so that the upper, intermediate and lower regions 11, 12 and 13 are exposed to the outside.

Although various embodiments of the disclosure are illustrated and described above, the disclosure is not limited to the specific embodiments described above, but various modifications may be made to those having ordinary skill in the art to which the disclosure belongs without departing from the subject matter of the disclosure claimed in the claims, and such changes are within the scope of the claims.

What is claimed is:

1. A display apparatus comprising:
a display comprising an upper region, a lower region, and an intermediate region;
a first roller around which the upper region of the display is to be rolled;
a second roller around which the lower region of the display is to be rolled;
a first drum rotatably supporting the first roller;
a second drum rotatably supporting the second roller;
a main body disposed between the first drum and the second drum in which the intermediate region is disposed on a front surface of the main body;
a first link connecting a left end of the first drum and a right end of the second drum and rotatably connected to the main body;
a second link connecting a right end of the first drum and a left end of the second drum and rotatably connected to the main body; and
a driver configured to rotate the first link and the second link in opposite directions,
wherein the first drum comprises first roller grooves to which the first roller is rotatably coupled,
wherein the second drum comprises second roller grooves to which the second roller is rotatably coupled,
wherein the driver comprises a first arm of which one end is connected to the first link, and a second arm of which one end is connected to the second link, and
wherein the driver is further configured to rotate the first arm in a first direction while rotating the first link in a second direction opposite to the first direction, and rotate the second arm in the second direction while rotating the second link in the first direction.

2. The display apparatus of claim 1, wherein a left end of the first link is slidably supported by the first drum and a right end of the first link is slidably supported by the second drum, and
wherein a left end of the second link is slidably supported by the second drum and a right end of the second link is slidably supported by the first drum.

3. The display apparatus of claim 2, wherein the first link comprises first and second protrusions respectively formed at the left end and the right end of the first link, and the second link comprises first and second protrusions respectively formed at the left end and the right end of the second link,
wherein the first drum comprises first and second grooves respectively formed at the left end and the right end of the first drum, the first protrusion of the first link is accommodated in the first groove of the first drum, and the second protrusion of the second link is accommodated in the second groove of the first drum, and
wherein the second drum comprises first and grooves respectively formed at the left end and the right end of the second drum, the first protrusion of the second link is accommodated in the first groove of the second drum, and the second protrusion of the first link is accommodated in the second groove of the second drum.

4. The display apparatus of claim 1, wherein
the one end of the first arm is connected to a point adjacent to a center of the first link, and
the one end of the second arm is connected to a point adjacent to a center of the second link, and
wherein the driver further comprises:
a first slider rotatably connecting the other end of the first arm and the other end of the second arm and disposed on a left side of the first arm and a left side of the second arm; and
a first driving motor for moving the first slider to left and right directions.

5. The display apparatus of claim 4, wherein the driver further comprises:
a third arm of which one end is connected to a point adjacent to the center of the second link;
a fourth arm of which one end is connected to a point adjacent to the center of the first link;
a second slider rotatably connecting the other end of the third arm and the other end of the fourth arm and disposed on a right side of the third arm and a right side of the fourth arm; and
a second driving motor moving the second slider to the left and right.

6. The display apparatus of claim 1, wherein the first link comprises a first support rib protruding forward to support a rear surface of the display, and wherein the second link comprises a second support rib protruding forward to support the rear surface of the display.

7. The display apparatus of claim 6, wherein the first support rib is formed along a length direction of the first link, and
wherein the second support rib is formed along a length direction of the second link.

8. The display apparatus of claim 1, wherein a sum of a weight of the first roller and a weight of the first drum is greater than a sum of a weight of the second roller and a weight of the second drum.

9. The display apparatus of claim 1, wherein the second link further comprises an accommodation groove formed in a central portion connected to the main body, and
wherein the first link has a central portion connected to the main body so as to rotate on a same plane as the second link.

10. The display apparatus of claim 1, further comprising:
a processor configured to control the driver to be in a first state in which the upper region is completely accommodated in the first drum and the lower region is completely accommodated in the second drum or a second state in which the upper region and the lower region are exposed to an outside.

11. The display apparatus of claim 1, further comprising a processor to control the driver to be withdrawn in response to an aspect ratio output by the display.

12. The display apparatus of claim 1, wherein each of the first roller and the second roller has a cylindrical shape and further comprises a plurality of support parts protruding along a longitudinal direction of the first roller and the second roller on an outer circumferential surface of a cylindrical shape.

13. The display apparatus of claim 1, further comprising:
a bracket to fix a side of the first drum and a side of the second drum.

14. The display apparatus of claim 1, further comprising:
a wall mount coupled to a rear surface of the main body to fix the display apparatus to a wall surface.

15. The display apparatus of claim 1, further comprising:
a printed circuit board (PCB) accommodated in the main body; and
a cable electrically connecting the PCB and at least one of an upper end and a lower end of the display.

16. A display apparatus comprising:
a display comprising an upper region, a lower region, and an intermediate region;
a first drum for accommodating the upper region;
a second drum for accommodating the lower region;
a main body disposed between the first drum and the second drum;
a first link connecting a left end of the first drum and a right end of the second drum and rotatably connected to the main body;
a second link connecting a right end of the first drum and a left end of the second drum and rotatably connected to the main body; and
a driver configured to rotate the first link and the second link in opposite directions,
wherein the driver is further configured to rotate the first link and the second link so that the display is disposed in a mode among a plurality of modes,
wherein the plurality of modes comprise a first mode in which the upper region is completely accommodated in the first drum and the lower region is completely accommodated in the second drum, a second mode in which the upper region and the lower region are completely exposed to an outside and a third mode in which a portion of the upper region is accommodated in the first drum and a portion of the lower region is accommodated in the second drum,
wherein the driver comprises a first arm of which one end is connected to the first link, and a second arm of which one end is connected to the second link, and
wherein the driver is further configured to rotate the first arm in a first direction while rotating the first link in a second direction opposite to the first direction, and rotate the second arm in the second direction while rotating the second link in the first direction.

17. The display apparatus of claim 16, wherein a left end of the first link is slidably supported by the first drum and a right end of the first link is slidably supported by the second drum, and
wherein a left end of the second link is slidably supported by the second drum and a right end of the second link is slidably supported by the first drum.

18. The display apparatus of claim 17, wherein the first link comprises first and second protrusions respectively formed at the left end and the right end of the first link, and the second link comprises first and second protrusions respectively formed at the left end and the right end of the second link,
wherein the first drum comprises first and second grooves respectively formed at the left end and the right end of the first drum, the first protrusion of the first link is accommodated in the first groove of the first drum, and the second protrusion of the second link is accommodated in the second groove of the first drum, and
wherein the second drum comprises first and grooves respectively formed at the left end and the right end of the second drum, the first protrusion of the second link is accommodated in the first groove of the second drum, and the second protrusion of the first link is accommodated in the second groove of the second drum.

19. The display apparatus of claim 16, wherein
the one end of the first arm is connected to a point adjacent to a center of the first link, and
the one end of the second arm is connected to a point adjacent to a center of the second link, and
wherein the driver further comprises:
a first slider rotatably connecting the other end of the first arm and the other end of the second arm and disposed on a left side of the first arm and a left side of the second arm; and
a first driving motor for moving the first slider to the left and the right.

20. The display apparatus of claim 19, wherein the driver further comprises:
a third arm of which one end is connected to a point adjacent to the center of the second link;
a fourth arm of which one end is connected to a point adjacent to the center of the first link;
a second slider rotatably connecting the other end of the third arm and the other end of the fourth arm and disposed on a right side of the third arm and a right side of the fourth arm; and
a second driving motor moving the second slider to the left and right.

* * * * *